O. FALKENWALDE.
ANTISKID CHAIN FOR AUTOMOBILE TIRES.
APPLICATION FILED APR. 13, 1910.
991,286.
Patented May 2, 1911.
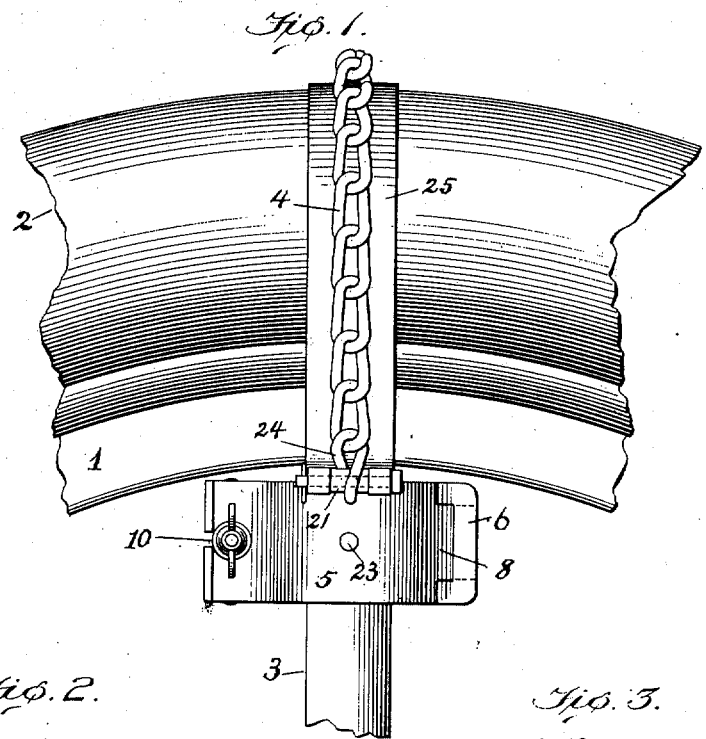
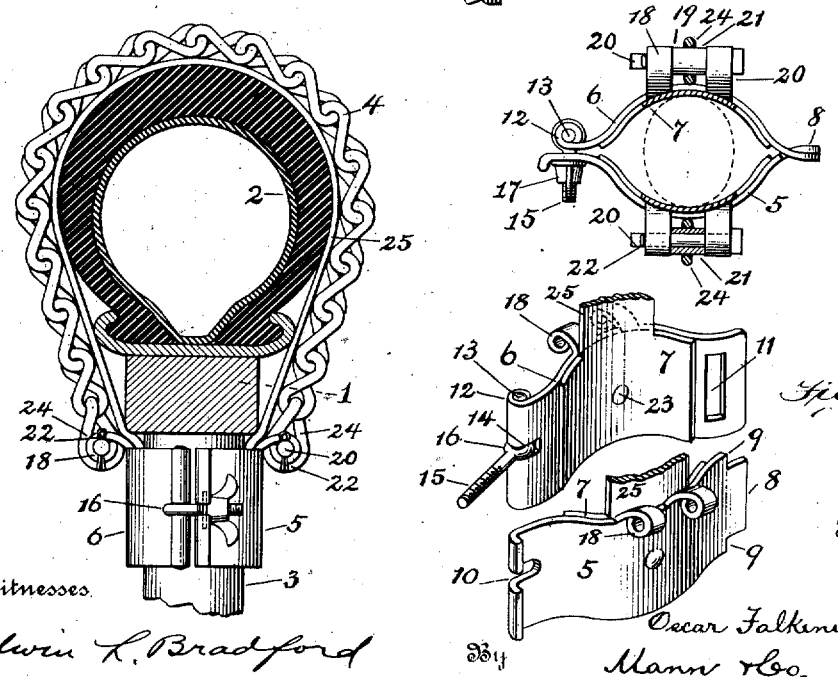

UNITED STATES PATENT OFFICE.

OSCAR FALKENWALDE, OF BALTIMORE, MARYLAND, ASSIGNOR, BY DIRECT AND MESNE ASSIGNMENTS, TO THE SNAP-ON TIRE CHAIN COMPANY, OF BALTIMORE, MARYLAND, A CORPORATION OF MARYLAND.

ANTISKID-CHAIN FOR AUTOMOBILE-TIRES.

991,286. Specification of Letters Patent. Patented May 2, 1911.

Application filed April 13, 1910. Serial No. 555,218.

*To all whom it may concern:*

Be it known that I, OSCAR FALKENWALDE, a citizen of the United States, residing at Baltimore, in the State of Maryland, have invented certain new and useful Improvements in Antiskid-Chains for Automobile-Tires, of which the following is a specification.

This invention relates to an improved anti-skid chain device for the tires of automobiles.

An anti-skid chain much used comprises two chains each of which has its ends fastened together to form a ring-shaped chain; these two ring-chains are placed one at one side of the tire, and the other at the opposite side, and numerous short chains cross over the tire and connect with said two ring chains. This device is cumbersome and gives rise to trouble when on the road.

One object of the present invention is to provide an improved single or individual cross-chain each end of which shall be attached to a separate half-clamp so that when the two half-clamps are so placed as to surround the spoke of a wheel the cross-chain will be securely held over the tread of the tire.

The invention is illustrated in the accompanying drawing in which,—

Figure 1 is a side view showing a broken portion of a wheel-rim, tire and one spoke, with the improved anti-skid chain in position. Fig. 2 is a cross-section view of the wheel-rim and tire, and also shows the anti-skid chain device in position. Fig. 3 is a view of the spoke-clamp with the parts in fastened position. Fig. 4 shows the two parts of the spoke-clamp separated.

Referring now to the drawings the numeral, 1, designates the wheel-rim; 2, the rubber tire, and, 3, a spoke of the wheel.

The anti-skid chain device, briefly, comprises a short chain, 4, to extend cross-wise of the tire; two half-clamps, 5, 6, which are separable and adapted, when together to clip around a spoke, 3, of the wheel, and each half-clamp attached to a different end of said cross-chain, 4. Thus constructed the spoke-clamp holds the cross-chain securely in position on the tire; and by opening the clamp and separating the two parts thereof, the chain may be quickly removed.

To more particularly describe the construction of the anti-skid chain device it may be stated, that each half clamp, 5, and, 6, is preferably covered on its concave face with leather or some suitable elastic material, 7, to prevent defacing the painted wheel-spoke. A rivet, 23, or other means may be used to fasten the sheet of elastic material, 7, to the said concave face. One half-clamp, 5, has at one end a tongue, 8, and a shoulder, 9, at each side of the tongue; the other end of the same half-clamp has a notch or slot, 10. The other half-clamp, 6, has at one end a cross-slot, 11, which receives the tongue, 8, and its other end has a coil, 12, that incloses a pin, 13; a slot, 14, is cut crosswise of the said coil, and a screw, 15, has for its head an eye, 16, that is held loosely in said slot, 14, by the pin, 13, passing through said eye; thus the screw, 15, is capable of swinging, and may swing into and out of the end notch or slot, 10, and a nut, 17, on the screw will hold the two half-clamps tightly around a spoke.

I have provided an improved construction of two half-clamps to which the ends of the chain are attached, so that when said clamps have been fastened on a wheel-spoke the greatest length of the clamps will not extend in a direction cross-wise of the wheel but will extend in a direction co-incident with the vertical plane of the wheel. By thus making provision whereby the ends of the spoke clamp will not project from the sides of the wheel, there is an avoidance of liability for the said clamps, when the wheel is revolving, to strike stones and other obstacles on the road and thereby be broken. In this clamp the ends of the cross-chain, 4, are attached to the center and midway of the ends of the two half clamps, 5, 6. In the present instance each half-clamp has two eyes or loops, 18, which are at the upper edges of said half-clamps and midway of the ends thereof; these two eyes are separated by a space, 19; and a pin, 20, passes through said two eyes, and a loose sleeve, 21, is on said pin and fills the space, 19. The cross-chain, 4, is attached to the half-clamp by one of the chain links, 24, coupling on the loose sleeve, which is held by the said pin, 20. A small pin, 22, passes crosswise through the pin, 20, and keeps the latter in position.

The cross chain, 4, may be in direct contact with the rubber tire, but I deem it better to protect the rubber tire from abrasion by interposing a sheet of leather, 25, or other suitable material, and securing it between the chain and tire. To carry this idea out, the leather, 25, may be attached to or be integral with the leather, 7, covering the concave face of the half-clamp, and then this strip of leather or other material may extend from one half-clamp, under the chain, to the other half-clamp, as seen in Figs. 1 and 2.

It will be seen by a person conversant with the use of chains to prevent automobile wheels from skidding that any number of the devices herein shown and described may be applied to the wheel—limited only by the number of spokes; that this device may be quickly applied to and removed from the wheel; that it will secure positive traction, and that any probability of the cross-chain injuring the rubber tire is minimized.

Having thus described my invention what I claim and desire to secure by Letters Patent is,—

1. An anti-skid device for vehicle wheels having a two-part separable clamp, a chain to cross the wheel tire and having one end attached to one clamp-part and the other end attached to the other clamp-part, and a flexible material at the inner face of each clamp part and projecting outwardly therefrom and beyond the connected ends of the chain.

2. An anti-skid device for vehicle wheels having a two-part separable clamp, a chain to cross the wheel tire and having one end attached to one clamp-part and its other end attached to the other clamp part, and a flexible material having one end attached to the inner side of one clamp-part and the other end attached to the inner side of the other clamp-part and said material extending at the inner side of said chain.

In testimony whereof I affix my signature in presence of two witnesses.

OSCAR FALKENWALDE.

Witnesses:
 CHAS. B. MANN,
 G. FERDINAND VOGT.